Apr. 10, 1923.

E. R. BITTLER

AUTOMOBILE DASH ATTACHMENT

Filed June 13, 1922

1,451,646

2 sheets-sheet 1

E. R. BITTLER
INVENTOR.

BY
Geo. P. Kimmel
ATTORNEY.

Apr. 10, 1923.
E. R. BITTLER
AUTOMOBILE DASH ATTACHMENT
Filed June 13, 1922
1,451,646
2 sheets-sheet 2
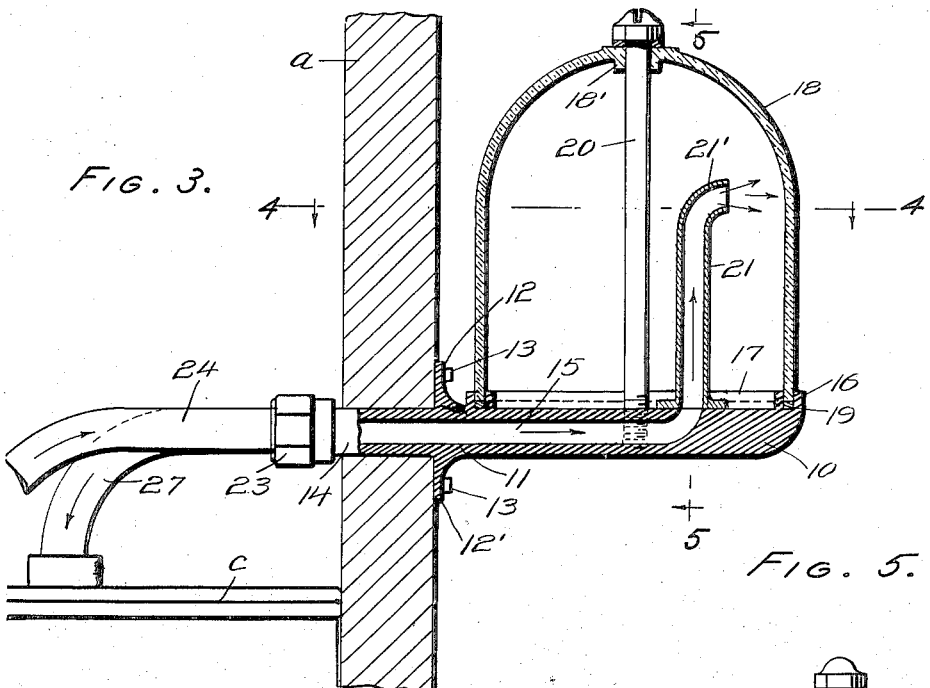
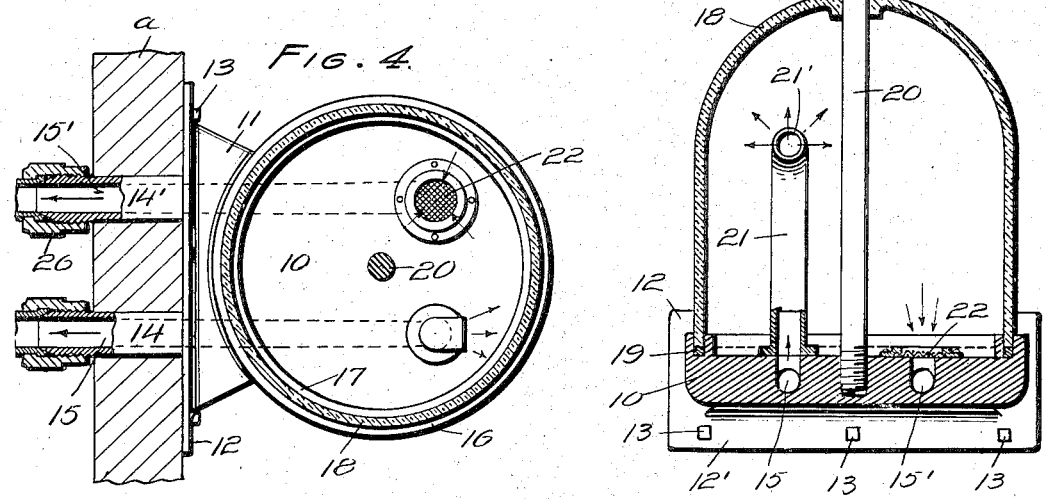
E. R. BITTLER INVENTOR.
BY Geo. P. Kimmel ATTORNEY.

Patented Apr. 10, 1923.

1,451,646

UNITED STATES PATENT OFFICE.

EDWARD R. BITTLER, OF SCHUYLKILL HAVEN, PENNSYLVANIA.

AUTOMOBILE DASH ATTACHMENT.

Application filed June 13, 1922. Serial No. 568,091.

*To all whom it may concern:*

Be it known that I, EDWARD R. BITTLER, a citizen of the United States, residing at Schuylkill Haven, in the county of Schuylkill and State of Pennsylvania, have invented certain new and useful Improvements in Automobile Dash Attachments, of which the following is a specification.

The invention appertains to certain improvements in attachments for automobile dashes or instrument boards generally, and has for its principal object to provide for a fuel indicating or sight feed type of such attachments.

Another object of the invention is to provide for an attachment of the class mentioned, and one embodying an extremely simplified and efficient construction and arrangement adapted for filtering the liquid fuel passed therethrough in addition to exposing of the fuel to the view of the operator of an automobile at all times, during the operation of the power plant of the automobile.

A further object of the invention is to provide for a combined sight feed and filter for the fuel supply of an internal combustion engine, and one of a simple construction and arrangement, comparatively inexpensive in manufacture, easy to install in position on the dash or instrument board of an automobile, and which is highly efficient in operation.

With the foregoing and other equally important objects in view, the invention resides in the certain new and useful construction and arrangement as will be more fully described, set forth in the appended claim, and illustrated in the accompanying drawings, in which:—

Figure 1:
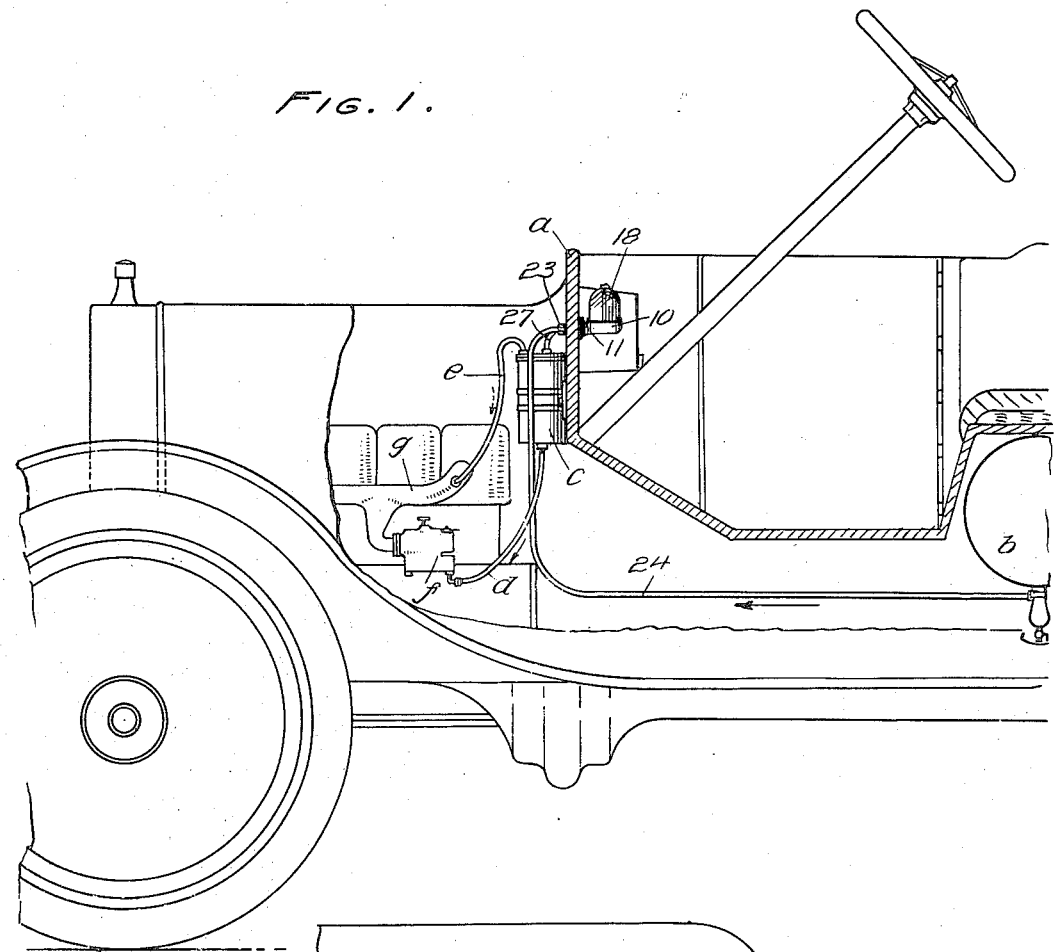
Figure 2:
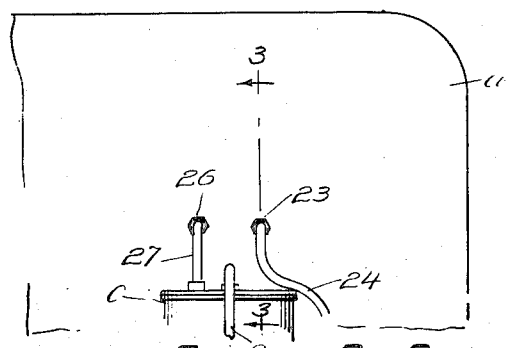

Figure 1 is a fragmentary side elevation, partly in section, of the forward portion of an automobile of conventional form, and showing the preferred embodiment of the attachment as the same appears when mounted in position on the dash or instrument board of the automobile and as connected to the fuel system thereof, Figure 2 is a fragmentary elevation of the forward side of the dash or instrument board, and showing the piping connections leading to the attachment from the upper end of the usual vacuum tank and from the main fuel supply tank of the automobile, Figure 3 is a vertical section taken on the line 3—3 of Figure 2, Figure 4 is a horizontal section taken on the line 4—4 of Figure 3, and, Figure 5 is a vertical section taken on the line 5—5 of Figure 3.

Referring to the drawings, wherein similar characters of reference designate corresponding parts throughout the several views thereof, and more particularly to Figures 3 to 5 of the same, the preferred embodiment of the attachment comprises a base member 10, preferably of cast metal or the like and circular in form, and having a laterally offset portion 11 provided with upper and lower flanges 12 and 12', by means of which the attachment is to be fastened in position on the face of the dash or instrument board *a* of an automobile, suitable screws 13 being passed inwardly of openings formed in the said flanges 12 and 12' for the purpose.

Projecting outwardly of the abutting face of the bracket portion 11 are a pair of spaced parallel tubular extended portions 14 and 14' having their bores 15 and 15', respectively, extending inwardly of the bracket portion 11 and the base member 10, and opening through the upper face of the latter at points beyond the plane of the main diameter thereof paralleling the said abutting face of the bracket portion 11. The circular base portion 10, is formed with an outer flanged portion 16, rising from its peripheral edge, and a second annular flanged portion 17, spaced inwardly of the flanged portion 16, to provide an annular groove or channel way between the same for the reception therein of the edge of the lower open end of a substantially bell-like cover 18, the latter being preferably formed of glass or other suitable transparent material, and having its lower edge seating against a compressible gasket 19, disposed in the bottom of the annular groove or channel-way between the flanged portions 16 and 17, whereby to prevent leakage there around. The upper end of the cover portion 18, is of substantially semi-spherical form, and has an apertured central thickened portion 18', downwardly through which is passed a securing screw 20, which has its lower end in threaded engagement with a complementally threaded recess opening upwardly of the upper face of the base portion 10, and centrally thereof.

Rising from the base plate or casing 10, with its bore alined with the inlet opening of the bore or duct 15, is tube 21 having its upper end curved as at 21', to discharge fuel therefrom outwardly and against the forward wall portion of the cover 18, the latter forming a closed fuel receiving chamber when properly secured in position on the base member 10. Secured on the upper face of the base plate 10, and overlying the outlet opening of the bore or duct 15', is a filter or strainer member 22, which comprises a substantially ring-like body formed at its under side with an annular seat for the reception of a circular piece of wire gauze or the like, which is held in position therein when the ring like body is secured on the body 10.

The device is to be installed on the dash or instrument board $a$, by the drilling through the same of a pair of horizontally disposed openings therethrough for the reception of the tubular extensions 14 and 14', when the flanged portions 12 and 12', of the bracket portion 11, will abut the rear face of the dash or instrument board $a$, and will be secured thereto by means of the screws 13. The end of the tubular portion 14, projecting through the dash or instrument board will now be coupled by means of a coupling 23, to the pipe line leading from the main fuel supply tank $b$, while similarly the projected end of the tubular extension 14', will be connected by means of a coupling 26, to a pipe connection 27, leading to and connecting the upper end of the vacuum tank $c$, the latter having its usual pipe connections $d$ and $e$, leading to and connecting the carbureter $f$, and the intake manifold $g$, respectively, of the internal combustion engine of the automobile, the pipe connection $d$, acting to supply fuel from the vacuum tank $c$, to the carbureter $f$, and the pipe $e$, functioning as a suction pipe for the creation of a vacuum within the vacuum tank $c$, during the operation of the engine.

In the operation of the device, the starting up of the engine of the automobile will create a suction in the intake manifold $g$, and in the pipe connection $e$, for the creation of the vacuum in the vacuum tank $c$, when fuel will be drawn from the main supply tank $b$, through the pipe line 24, and will discharge inwardly of the bore or duct 15, of the tubular extension 14, and the body 10, and will pass upwardly of the inlet tube 21, and discharge therefrom into the closed chamber of the device and against the forward wall position of the cover member 18, and consequently in plain view of the driver of the automobile at all times. The fuel will now pass through the filter or strainer 22, into the bore or duct 15', and outwardly through the tubular extension 14', to the pipe 27, and into the vacuum tank $c$, which will function in the usual manner to supply the fuel as needed to the carbureter $f$, through the pipe connection $d$.

From the foregoing, it will be readily apparent that, while a preferred embodiment of the device has been described and illustrated herein in specific terms and details of construction and arrangement, various changes in and modifications of the same may be resorted to without departing from the spirit of the invention, or the scope of the claims appended hereto.

Having thus fully described the invention, what is claimed, is:—

A device for the purpose set forth comprising a base having a forwardly projecting integral supporting extension provided with inlet and discharge bores opening at the upper face of the base at each side of the center thereof, a hollow transparent body mounted on the base and forming in connection with the latter a fuel receiving chamber, means extended through the chamber and engaging with said body and base for connecting them together, a fuel discharging element within said chamber and having one end opening thereinto and its other end registering with the inlet bore, and a filtering element associated with said outlet bore.

In testimony whereof, I affix my signature hereto.

EDWARD R. BITTLER.